Jan. 29, 1952     E. C. S. CLARK     2,583,929
FISHING BOAT
Filed July 27, 1948                       3 Sheets-Sheet 2
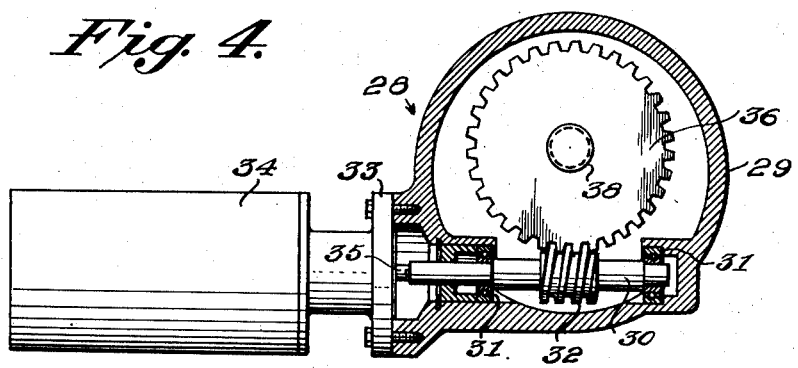
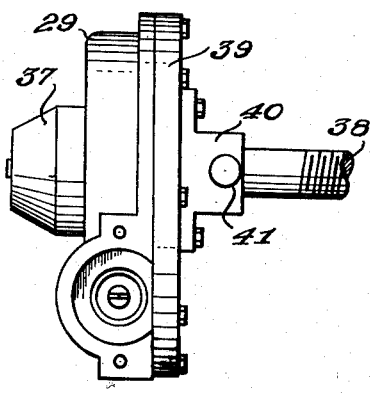
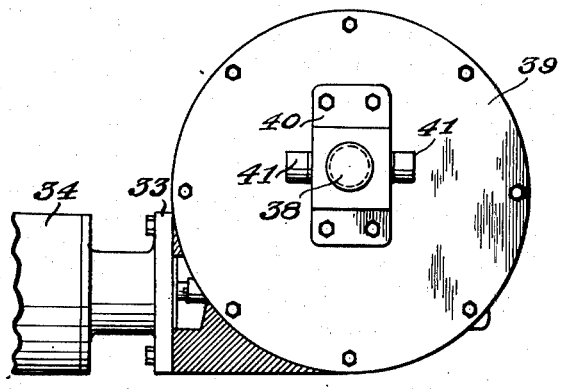
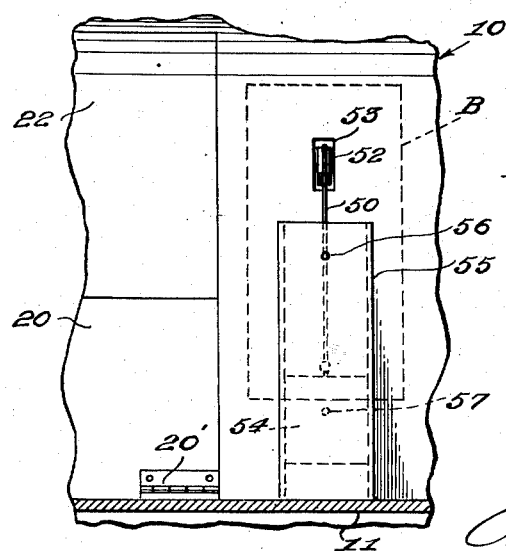
INVENTOR.
Ephraim C. S. Clark.
BY
ATTORNEY Jan. 29, 1952 E. C. S. CLARK 2,583,929
FISHING BOAT
Filed July 27, 1948 3 Sheets-Sheet 3
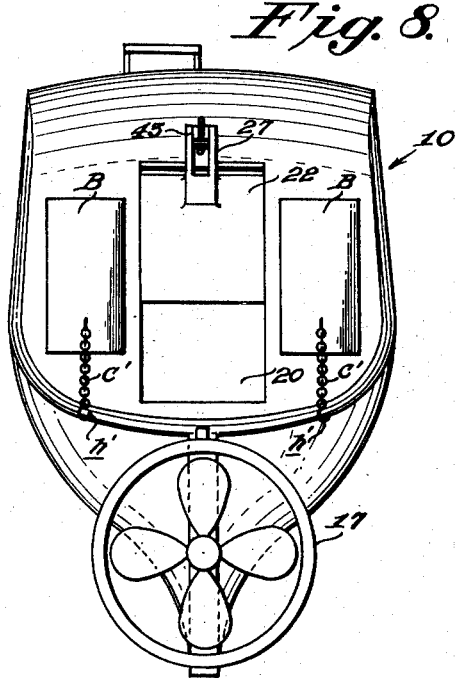
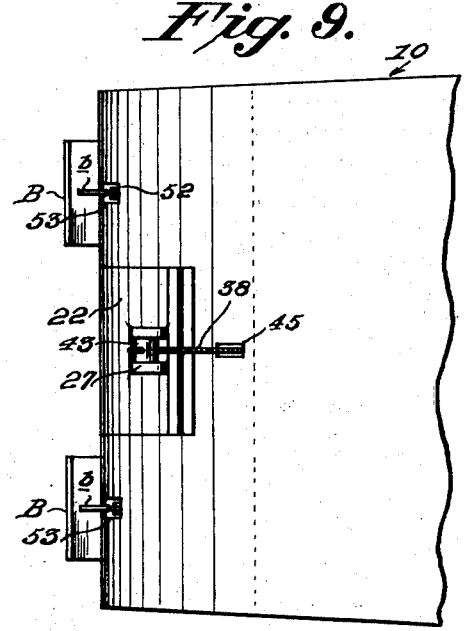
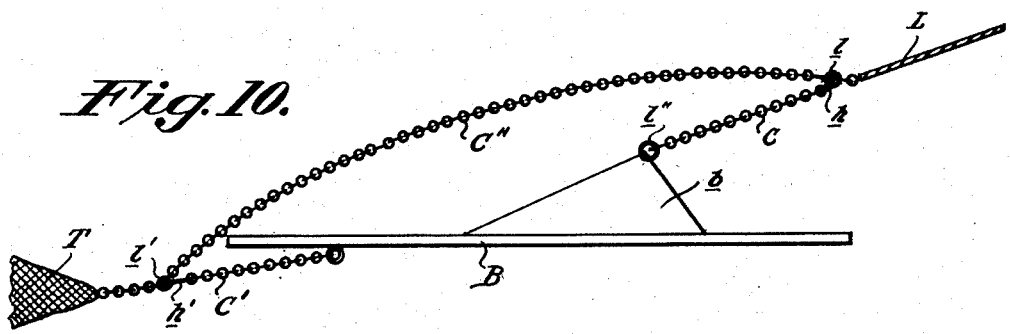
INVENTOR.
Ephraim C. S. Clark.
BY
James Atkins
ATTORNEY Patented Jan. 29, 1952

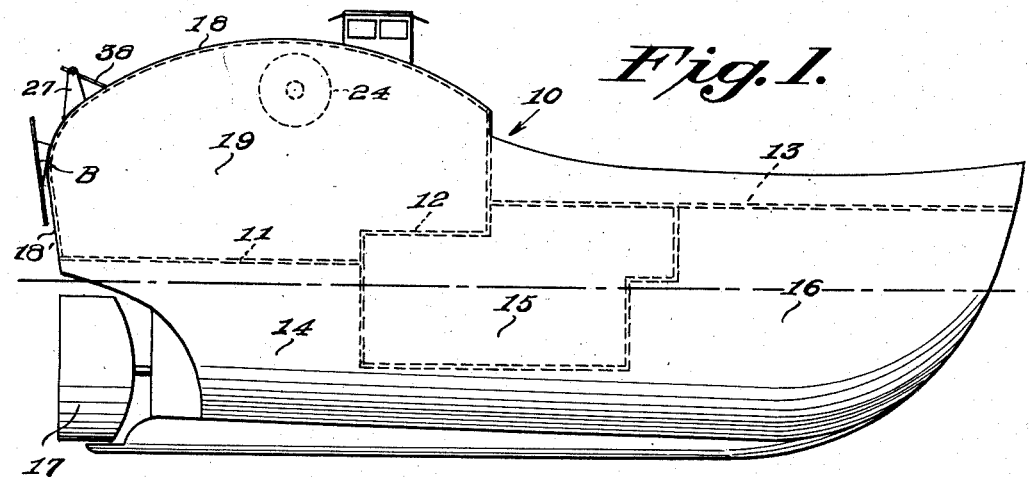
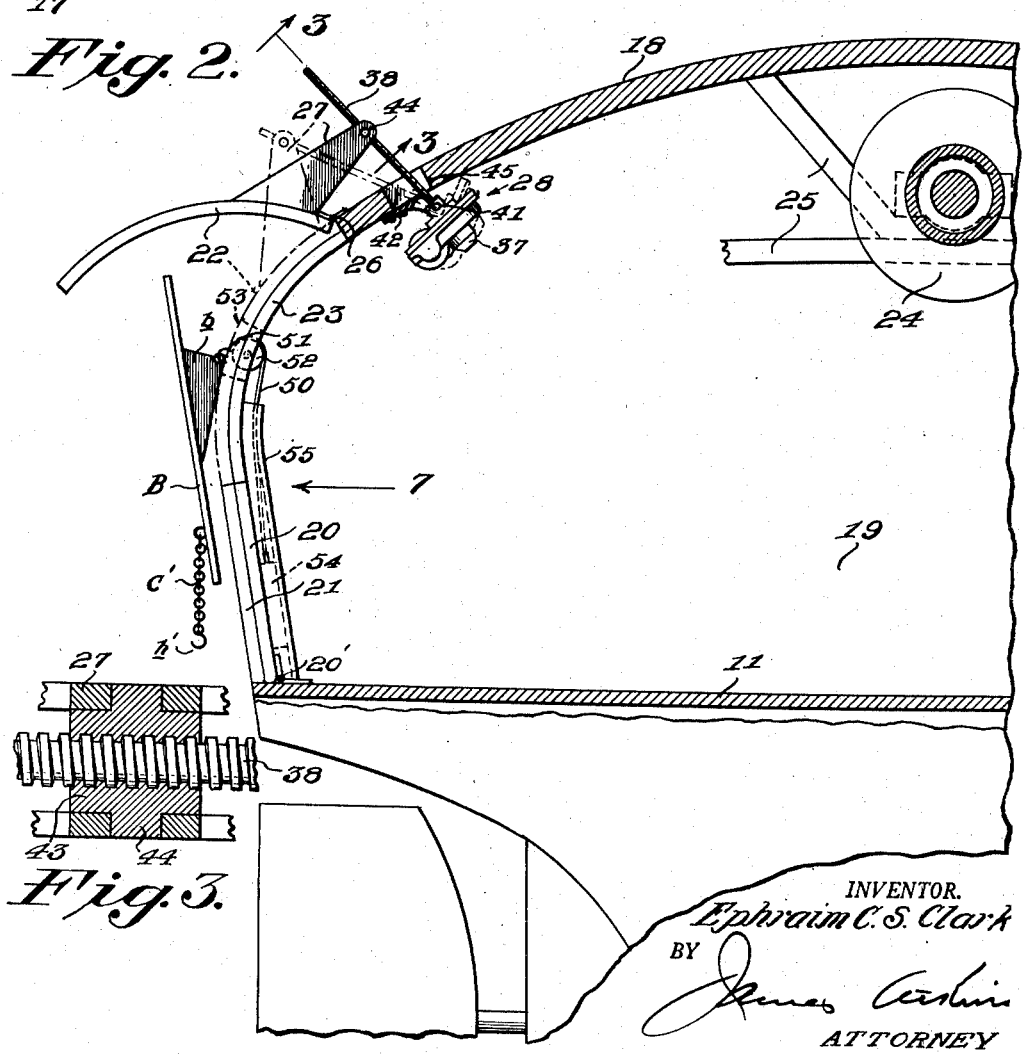

2,583,929

UNITED STATES PATENT OFFICE 2,583,929

FISHING BOAT

Ephraim C. S. Clark, Gloucester, Mass.

Application July 27, 1948, Serial No. 40,820

1 Claim. (Cl. 114—0.5)

This invention relates to a fishing boat.

The invention is more particularly concerned with an improved boat construction adapted for use in trawling, and it embodies novel structural arrangements for facilitating the handling of the trawls.

A primary object of the invention is to provide a fishing boat having a novel stern arrangement embodying a substantially water level fish-handling deck and means operatively disposed above such deck for handling of trawl nets and the otter boards associated therewith.

A further object of the invention is to provide a fishing boat having an enclosed fish-handling compartment adjacent the stern thereof and which embodies a substantially water level fish-handling deck and a roof arched longitudinally of the boat and providing a rear stern end wall of the compartments, there being a net-storing winch operatively supported by the roof, and a power-operated door normally closing a trawl-admission opening in the rear end wall.

A still further object of the invention is to provide a fishing boat embodying a fish-handling compartment having a trawl net-storing winch therein, the compartment being in part defined by a vertically curved rear stern wall, a net-admission opening in the wall, a power-operable door normally closing the opening, and gravity-actuated means for moving otter boards when released from a trawl into stowed position on each side of the opening.

A still further object of the invention is to provide a fishing boat embodying novel structural arrangements for adapting same to maximum efficiency when in use.

Other objects and advantages of the invention will become apparent in the course of the following detailed description, taken in connection with the accompanying drawings, wherein:

Figure 1 is a side elevational view of the improved boat in accordance with a preferred structural embodiment thereof, the various decks being indicated in dotted lines.

Figure 2 is a longitudinal vertical sectional view of the stern of the boat on a substantially enlarged scale and showing in particular the deck house door-operating means and the otter board stowing means.

Figure 3 is an enlarged sectional view in the plane of line 3 on Figure 2.

Figure 4 is a view partially in section and partially in elevation of the deck house door operating jack.

Figure 5 is an elevational view as observed from the left of Figure 4 with the motor removed.

Figure 6 is a broken view corresponding to Figure 4 but showing the housing cover plate applied.

Figure 7 is a broken elevational view as observed in the direction of arrow 7 on Figure 2.

Figure 8 is a rear elevational view of the boat showing the otter boards stowed.

Figure 9 is a broken top plan view of the stern of the boat.

Figure 10 is a more or less diagrammatic view of a trawl gear.

Referring now in detail to the drawings by use of reference characters, 10 designates the improved boat in its entirety, and while the boat is disclosed as of a particular external form, it is not limited thereto within the scope of the present invention.

The boat includes successively higher decks 11, 12 and 13, with the first substantially at water level, and the boat is preferably provided beneath the respective decks 11, 12 and 13 with suitable equipment compartments 14, 15 and 16, and suitable propelling means 17 is provided adjacent the stern of the boat.

The boat is provided with a roof 18 which, as is more particularly indicated in Figure 1, is of arched form and includes a rear end wall 18' of a fish-handling compartment 19 which is disposed above the low deck 11.

The rear stern wall 18' is provided with a rectangular stern board 20 which normally closes an opening 21 adjacent the deck 11, and the board is pivotally supported at its lower edge as at 20' for swinging movement within the compartment 19 for opening or closing the opening 21.

Disposed immediately above the board 20 is a door or deck cover 22 for an opening 23 for admission of trawl nets onto a winch 24 suitably supported from the roof 18, and the support for the winch may include any suitable suspension means, as is indicated at 25.

The winch 24 per se forms no part of the present invention since its structure and operation are fully disclosed in my co-pending application, Serial No. 23,521, filed April 27, 1948, now Patent No. 2,555,676 which issued June 5, 1951.

The cover 22 is hingedly connected at 26 at the upper edge of the opening 23 for swinging movement externally of the compartment 19, as is clearly indicated in Figure 2, and the extent of opening of the cover may be varied to suit any required conditions in admitting a trawl through the opening 23 and onto the winch 24.

The invention includes novel power means for swinging the cover 22 on its hinge connection 26, and such means includes the following structure.

The cover 22 is provided with a bifurcated bracket 27 externally thereof. A cover-operating jack 28 is operatively disposed within the compartment 19 and above the cover opening 23, as is clearly shown in Figure 2.

The jack 28 includes a gear housing 29 having a shaft 30 journalled in bearings 31, and the shaft rigidly supports a worm gear 32. A plate 33 is removably supported by the housing 29 and carries a reversible motor 34 having a drive shaft 35 releasably engaged with the worm gear shaft 30.

Rotatably journalled in an extension 37 of the housing 29 is a gear 36 and which is in mesh with the worm gear 32, whereby the gear 36 is slowly rotated upon rotation of the gear 32 by the motor 34.

The gear 36 has a screw 38 projecting axially therefrom, and which extends through a housing cover plate 39 and a bracket 40 having oppositely disposed trunnions 41.

The trunnions 41 are rotatably supported in a bracket 42 rigidly supported on the inner wall of deck roof 18 for bodily swinging movement of the jack 28, as is necessitated by swinging of the cover 22.

The screw 38 cooperates with an internally threaded block 43 having opposed trunnions 44 rotatably supported by the outer end of the bracket 27.

By pivotally mounting the jack and by provision of the block 43 the door 22 may be swung on its hinge 26 without strain on the screw 38. Since the screw 38 is subject to movement laterally of its axis in the operation of opening or closing the cover it is necessary to provide a slot 45 in the deck roof 18, and while such slot may be left open, it is desirable that same be kept closed by some means, as, for example, a canvas boot now generally used for this purpose.

The purpose of the cover-controlled opening 23 is to admit a trawl into the compartment 19 for winding onto the winch 24, which, of course, draws the trawl through the opening.

In Figure 10 is illustrated in top plan one side of a trawl structure embodying the net T and associated otter board B, there, of course, being a like arrangement at the other side of the mouth of the net, whereby two boards B are included in each trawl structure.

The diverging sections L of the tow line each includes a length of chain C'' which, in fishing operation of the trawl, is slack and plays no part in drawing the trawl through the water. The chain C'' includes a large link l and l' at each of its two ends.

The board B is provided with a chain C having one end connected with the board bracket b, and such chain carries a hook h at its other end which detachably engages the link l. The board B is provided with a second chain C' having one end connected thereto, and the other end of this chain is provided with a hook h' detachably engaged with the link l' which is disposed in chain C'' in spaced relation to the net T.

With this arrangement the net is drawn through the water in substantially the usual way but with the chain C'' remaining ineffective.

Upon storing the trawl, as by winding the net onto the winch 24, it is necessary that the otter boards B be removed and this is effected by disengagement of the hooks h and h' from the respective links l and l', whereupon the chain C'' becomes effective to haul the net into the compartment 19 for winding onto the winch 24.

The boat includes novel means for stowing the boards B externally of the rear wall 18' after same have been released from the chains C'', and such means in a preferred embodiment thereof includes, at each side of cover 22, a suitable cable or chain 50 having a hook 51 at its free end for engagement with link l'' on the board bracket b.

The cable 50 extends over a pulley 52 rotatably journalled in a slot 53 in wall 18', and the other end of the cable is secured to a weight 54 which is vertically slidably disposed in a guideway 55 disposed internally of the compartment 19.

The weights 54 are such as to hold the boards B up in stowed position, as indicated in Figures 2 and 8. In order to hold the weights 54 in upper position with the hooks 51 disposed for connection with links l'' the guideway 55 and weight 54 are respectively provided with apertures 56 and 57 for removably receiving a pin.

With the weights in such upper position and when it is desired to store the trawl, the hooks 51 are engaged with the board links l'', the trawl is then slacked to facilitate disengagement of hooks h and h' from links l and l' and the pins are then removed from the apertures 56 and 57, whereupon the weights 54 automatically raise the boards B to the stowed position indicated in Figures 2 and 8.

While I have disclosed my invention in accordance with a single specific structural embodiment thereof, such is to be considered as illustrative only, and not restrictive, the scope of the invention being defined in the following claim.

What I claim and desire to secure by U. S. Letters Patent is:

A trawler having an enclosed fish handling compartment at the stern thereof, including a substantially water level fish handling deck, an arched roof and a rear end wall, said end wall and roof having therein an opening extending upward from said deck and adapted to admit a trawl, means for closing said opening including a door and a stern board, said door having its upper portion positioned in said roof and being pivotally mounted at its top edge for swinging outwardly to clear said opening, said stern board being positioned in said end wall and being pivotally mounted at its bottom edge adjacent said deck to swing inwardly on said deck, the bottom portion of said door and the upper portion of said stern board coacting with each other when closed to completely close said opening, power means connected to said door for operating the same, a net handling winch within said compartment and otter board engaging hooks supported by the rear wall at opposite sides of said opening.

EPHRAIM C. S. CLARK.

REFERENCES CITED

The following references are of record in the file of this patent:

UNITED STATES PATENTS

| Number | Name | Date |
| --- | --- | --- |
| D. 117,626 | Bromfield | Nov. 14, 1939 |
| 247,187 | Fox | Sept. 20, 1881 |
| 276,913 | Smith | May 1, 1883 |
| 280,552 | Alfson | July 3, 1883 |
| 713,198 | Brady | Nov. 11, 1902 |
| 1,133,700 | Besile | Mar. 30, 1915 |
| 1,674,662 | Rountree | June 26, 1928 |
| 1,863,989 | Liisanantti | June 21, 1932 |
| 1,957,990 | Austin | May 8, 1934 |
| 2,141,181 | Geddes | Dec. 27, 1938 |

FOREIGN PATENTS

| Number | Country | Date |
| --- | --- | --- |
| 13,567 | Great Britain | June 2, 1897 |